United States Patent
Luchetti

(10) Patent No.: US 6,813,874 B2
(45) Date of Patent: Nov. 9, 2004

(54) TOWED RAY RAKE WITH INDEPENDENT ADJUSTMENTS

(75) Inventor: Fiorenzo Luchetti, Citta'di Castello-Perugia (IT)

(73) Assignee: Faza S.R.L., Citta'Di Castello (PG) (IT)

(*) Notice: Subject to any disclaimer, the term of this patent is extended or adjusted under 35 U.S.C. 154(b) by 0 days.

(21) Appl. No.: 10/445,898

(22) Filed: May 28, 2003

(65) Prior Publication Data

US 2004/0079066 A1 Apr. 29, 2004

(30) Foreign Application Priority Data

Oct. 29, 2002 (IT) .................................... AR2002A0036

(51) Int. Cl.[7] .................... A01D 76/00; A01D 78/00; A01D 80/00; A01D 84/00
(52) U.S. Cl. ........................ 56/365; 56/377; 56/384
(58) Field of Search ...................... 56/330, 377, 375, 56/376, 378, 379, 380, 381–392; 172/311, 456, 458, 659, 662; 403/321; 111/52, 200

(56) References Cited

U.S. PATENT DOCUMENTS

| | | | |
|---|---|---|---|
| 4,974,407 A | 12/1990 | Rowe et al. | 86/377 |
| 4,977,734 A * | 12/1990 | Rowe et al. | 56/15.9 |
| 4,996,833 A * | 3/1991 | Von Allowerden | 56/367 |
| 5,263,306 A * | 11/1993 | Tonutti | 56/377 |
| 5,305,590 A * | 4/1994 | Peeters | 56/377 |
| 5,540,040 A * | 7/1996 | Peeters | 56/377 |
| 5,685,135 A * | 11/1997 | Menichetti | 56/365 |
| 5,740,870 A * | 4/1998 | Rodgers et al. | 172/456 |
| 5,899,055 A * | 5/1999 | Rowse et al. | 56/377 |
| 6,405,517 B1 * | 6/2002 | Peeters et al. | 56/377 |

* cited by examiner

Primary Examiner—Árpád Fabián Kovács
(74) Attorney, Agent, or Firm—Young & Thompson

(57) ABSTRACT

A rake includes a draw bar, anchored at the back to a cross bar ending with hinges having a rotation axis that is parallel to the draw bar. The cross bar is connected through the hinges with two arms, each one appropriate for sustaining the supporting elements of a group of ray rakes. The rake also includes supporting and regulating members for raising the cross bar from the ground and therefore the group of ray rakes, and actuator elements, independent from each other, through which the operator guides the movements of the supporting elements and those of the supporting and regulating members for raising the cross bar from the ground.

9 Claims, 3 Drawing Sheets

TOWED RAY RAKE WITH INDEPENDENT ADJUSTMENTS

BACKGROUND OF THE INVENTION

The invention relates to a towed ray rake with independent adjustments for the movement of the cut fodder lying on the ground.

There are known rakes, that can be towed normally by tractors with tires, made of an articulated structure with supporting wheels, with a tow and coupling bar and, on the side, with two groups of ray wheels appropriate for moving hay or other fodder lying on the ground.

During the working phase, the groups of ray wheels are extended to the sides of the towed vehicle, along two lines that converge towards the mid line of the machine at the back.

During the transport phase the two groups of ray wheels are instead rotated above the towed vehicle, in a position that makes it occupy a limited space on the road and with the ray rake teeth raised above the ground.

Normally, in passing from the operational position to the transport position, the raking devices, are rotated upwards, towards the middle and then towards the front part of the towed vehicle where the draw bar and the tractor are located with a single operation.

This movement reduces the overall width of the machine to make it appropriate for road transport, during which it is necessary for it to occupy a minimal space of the road. At the same time it is necessary that the teeth of the rakes should be raised from the ground. In the known embodiments, said movement is effected by means of a single command. This activates one or more jacks which command the simultaneous rotation of the groups of rakes, for each of which the three above stated movements are effected simultaneously, and therefore not independent one from the other.

The execution of said movements, in the various known technical embodiments, is carried out by means of normally complex joints and which anyhow are such as to impede the operator from modifying, to his requirements and independently one from the other, the positions of the rakes with respect to the ground and to the frame or part of the frame that supports them.

In fact in a known embodiment, created by the inventor of the present invention, the rake comprises a draw bar that is fixed to a frame that is limited at its back by a beam that ends with the wheel hubs, at its front by a beam that ends on two hinges with an axis converging towards the back of the cart.

Said hinges are connected to two rotating arms, an extension of the front beam of the cart, on which the supports of the two groups of rakes are mounted.

Two jacks join points placed towards the center of the front beam with two wings emerging from the rotating arms, in a way that the activation of the said jacks determines the composite rotation of the two groups of ray rakes.

In another production embodiment, the object of the U.S. Pat. No. 4,977,734 dated Dec. 18, 1990, the machine is constituted of a draw bar and a frame connected by hinges.

On the front beam of the frame we have the wheel hubs, while the back beam is joined by an arm to a jack supported by the draw bar.

The activation of the jack causes the rotation of the frame along the axis where the wheels and hinges connecting the draw bar and frame are placed, as well as the rotation of the supports that sustain the ray rake groups by means of a joint which unites them to a beam that is fixed to the draw bar.

Therefore, by activating the command jack we have the simultaneous upward rotation of the supports of the groups of ray rakes, their rotation towards the middle axis of the frame and towards the front part of the frame.

In another production embodiment, the object of the U.S. Pat. No. 4,974,407 dated 25 Jul. 1994 the machine is composed of a draw bar fixed to a frame to which are anchored the wheel hubs.

On said frame are fixed two tubular guides pointing upwards, towards the back and towards the middle axis of the same frame.

The shafts, that support each one a reverse T-shaped structure on which the groups of ray rakes are placed, are housed within the said guides.

Two jacks connect points positioned towards the center of the frame with the rotation shafts, so that the activation of said jacks determines a composite rotation of the ray rake groups each of which is subjected in this way, during its transit from the working position to that of transfer, to an elevation, to a movement towards the median line of the frame and to a movement towards the tractor.

In the prior art ray rakes, by means of often complex articulations, with the problems that this entails, we have therefore composite movements of the ray rake groups. In the said ray rakes the operator cannot intervene to modify the relationships between each of the three movements of each composite movement.

It is therefore impossible to render at least some of said movements independent one from the other, so as to make each group of ray rakes assume different positions from those foreseen in the project.

Therefore said rigidity impedes the operator from intervening on the disposition of the ray rake groups to adapt them to the terrain in the event in which it should not be flat and/or in the event in which the tractor should move on a road that is on a different level from that of the ground on which the hay or other fodder to be moved is distributed.

Furthermore, the prior art machines do not allow a fine adjustment of the height of the groups of ray rakes to modify the distance of their wire shaped teeth from, the ground where the fodder to be moved is laid out.

Said wire-shaped teeth should in fact skim the ground to be moved by it and, at the same time, they should move the cut fodder.

An imperfect adjustment of the distance of said teeth from the ground, in the event in which this should be sandy, will determine the movement of the fodder, but also of the superficial layer of the same ground which is raised and mixed with the same fodder.

On the other hand a raising by rotation of the ray rake discs determines a change in their orientation, and of that of their flexible teeth, therefore of their efficiency rendering this action disadvantageous.

Furthermore, in the prior art ray rakes, the movement on the ground to pass from one work area to another that is non adjacent requires a rotation operation of the ray rake groups above the cart, with a relatively long activation and a successive corresponding operation to bring the ray rake groups back to their work position.

SUMMARY OF THE INVENTION

The aim of the present invention is the realization of a towed type ray rake, the structure of which is easy to produce and which presents articulations that are also easy to manufacture which undergo low stress during their activation to make a safe and durable machine.

Another aim is to manufacture a machine which presents the rotation movements and those of the raising from the ground of the ray rake groups, independent one from the other, so as to allow the operator to chose an optimal position of the same ray rake groups each time, for the transfer of the machine on the field, for the transfer on the road, for the movement of the machine on the ground during working phases, with terrain that could be uneven and of any type, that is clay or sand.

The invention that has allowed to reach said results is realized by a machine comprising:

- a draw bar and a cross bar, joined together, the latter aimed to sustaining the supporting means of the groups of ray rakes which are revolving on a plane that is nearly perpendicular to the axis of the draw bar;
- supporting and regulating means for raising the cross bar from the ground;
- actuator means independent one from the other with which the movement of the supports of the ray rake groups and those of the supporting and regulating means for the raising of the cross bar from the ground and therefore of the ray rake groups supported by it are controlled.

A similarly structured machine is particularly advantageous because it is very simple to realize and therefore has contained costs, since it has actuator means, with which the height of the cross bar from the ground is regulated, which are different from the actuator means with which the rotation of the supporting means of the ray rake groups is controlled.

Other advantages will be apparent, particularly to technicians in this field, by reading the detailed description which follows and which is referred to the preferred embodiment reproduced as an example in the enclosed drawings.

Figure 1:
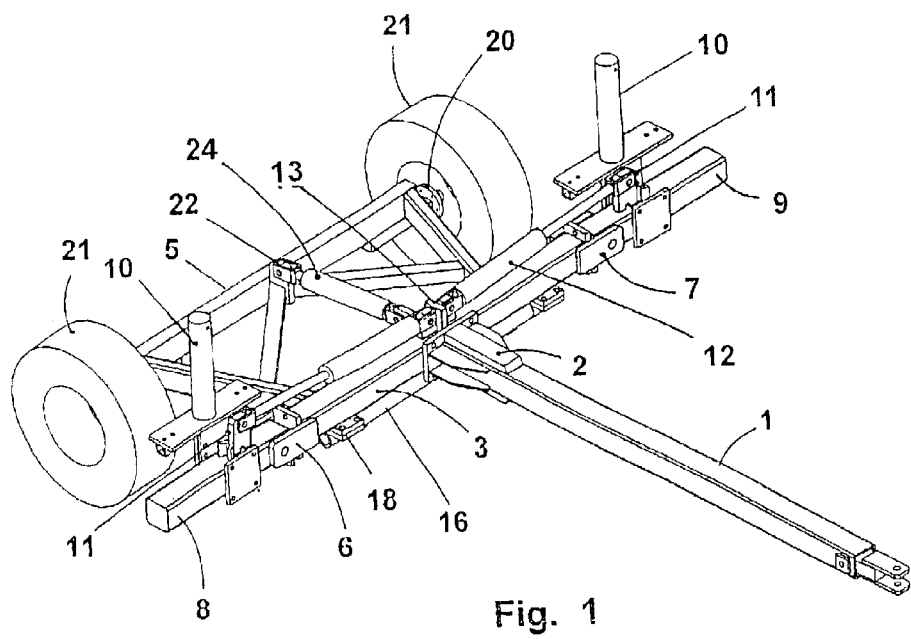
FIG. 1 is the axonometric view of the draw bar and the cross bar aimed at supporting the ray rake groups, of the raising and supporting groups on which the wheels with tires are placed and of the actuator means.
Figure 2:
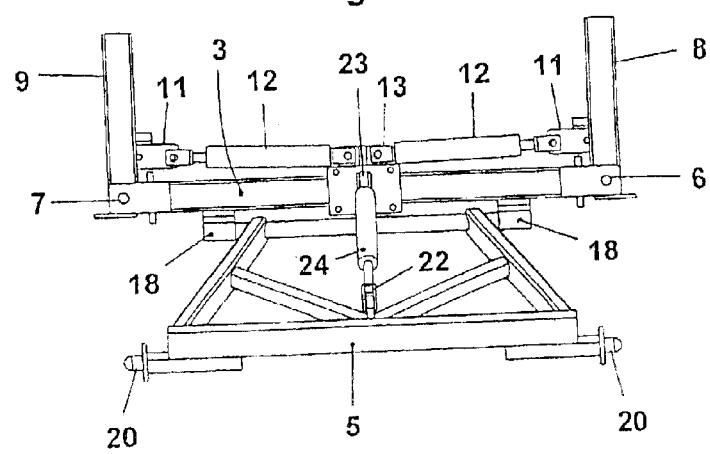
FIG. 2 is the view from the axial direction of the draw bar and the cross bar with the said draw bar connected to it, of the rotating arms, an extension of said cross bar, and of two jacks which control the rotation of said arms, reproduced in a normal position in respect to the cross bar which supports them.
Figure 3:
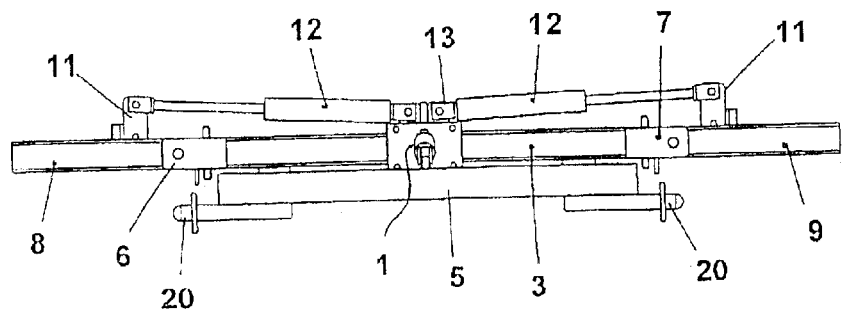
FIG. 3 is the view of the group of FIG. 2 with the rotating arms reproduced in a position that is nearly aligned with the cross bar that supports them.
Figure 4:
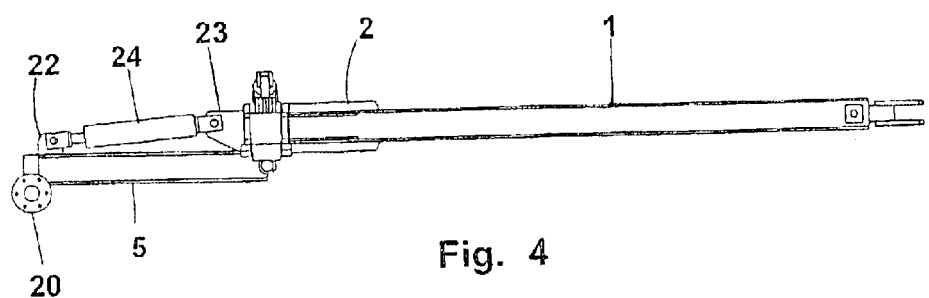
FIG. 4 is the side elevation view of the draw bar and the cross bar connected to it, as well as of the supporting and raising means, furnished with wheel hubs, reproduced in working position.
Figure 5:
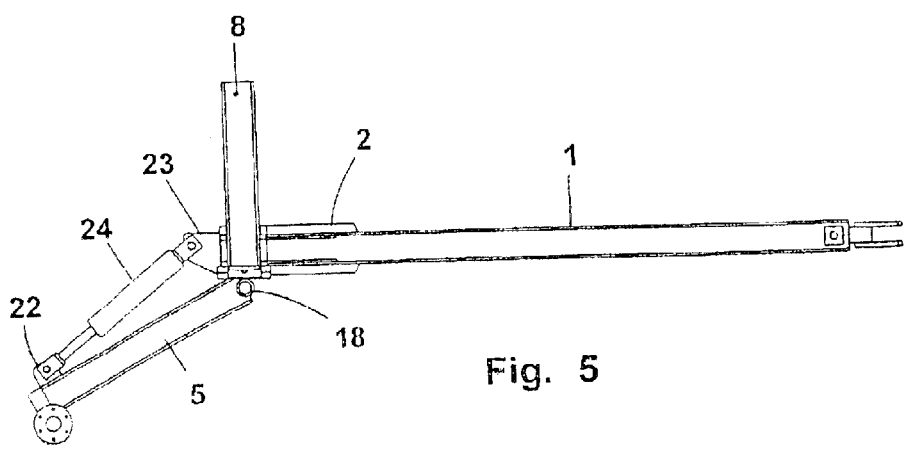
FIG. 5 is the side elevation view of the group of FIG. 4 with the supporting and raising means in the transfer position.
Figure 6:
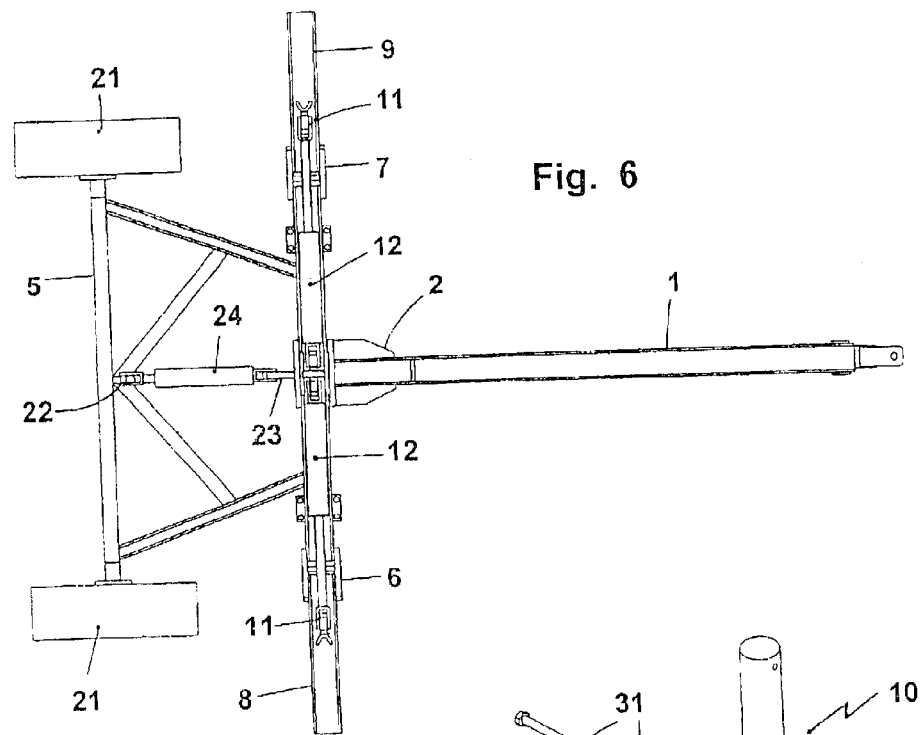
FIG. 6 is the top plan view of the draw bar with the cross bar aimed at supporting the ray rake groups, of the actuator means, as well as of the supporting and raising means furnished with wheels and tires.
Figure 7:
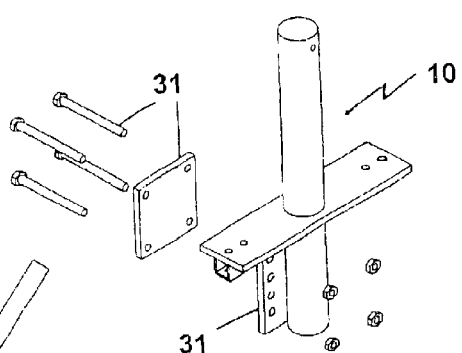
FIG. 7 is the axonometric view, in a different scale, of a device capable of supporting a ray rake group on rotating arms supported by the cross bar connected to the draw bar.
Figure 8:
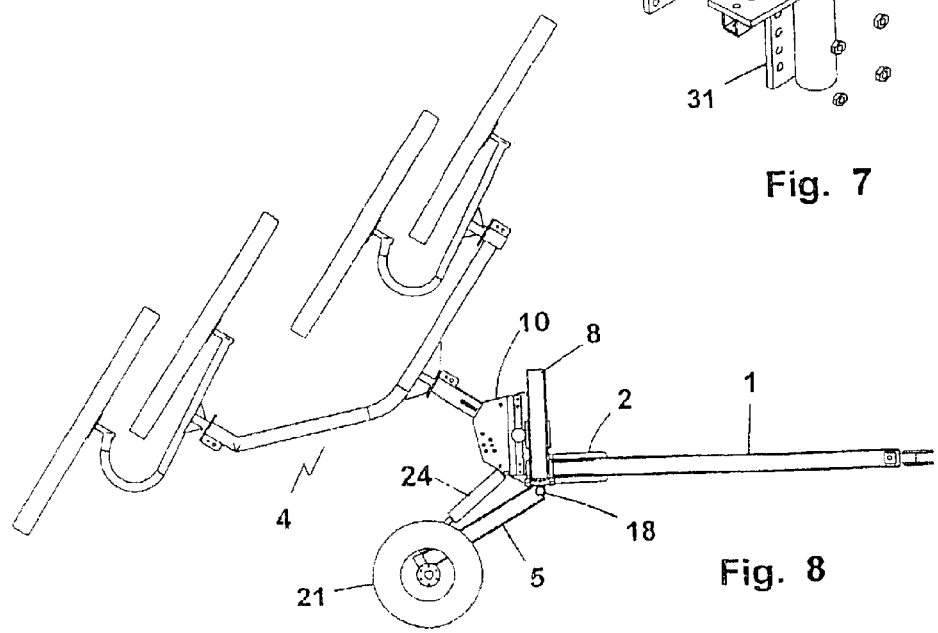
FIG. 8 is the side elevation view of the said ray rake, equipped with a group of four ray rake discs placed in the transfer position.

It is understood that the drawings have an exemplifying nature only to assist the comprehension of the invention, without constituting any limitation for it.

DESCRIPTION OF THE PREFERRED EMBODIMENTS

In substance the invention comprises a towed ray rake, characterized by a particular support structure and by independent adjustments of the position of the ray rake groups, so as to allow the operator to position them, each time, in the best position in function of, for example, the type and configuration of terrain on which the machine operates, or in function of the level of the road with respect to that of the terrain to which the machine must be transferred.

Said ray rake includes:

- the draw bar 1, fixed at its base 2 with the cross bar 3 which is meant to carry the ray rake groups 4;
- the supporting and regulating means 5 for raising the cross bar 3 from the ground;
- the actuator means through which one activates the rotation of the ray rake groups 4 to a level that is nearly perpendicular to the axis of draw bar 1 and, in an independent way, to guide the variations of the level of cross bar 3 with respect to the road.

Cross bar 3 has at its ends the hinges 6 and 7, each with rotation axis that is parallel to the axis of draw bar 1. Said hinges 6 and 7 are intended to support arms 8 and 9 on which the ray rake groups 4 are fixed through appropriate supporting means 10, normally supplied with screws, blockage plates and counter plates 31.

Each of the arms 8 and 9, or each of the supporting means 10 positioned and stabilized in said arms, has fixing wings 11 to which can be fixed the end of a jack 12, the other end of which will be fixed to a corresponding attachment wing 13 placed on cross bar 3, towards the base 2 of draw bar 1.

The rotations of arms 8 and 9 on hinges 6 and 7, which join them to the said cross bar 3, are controlled by means of two jacks 12.

The two jacks 12, capable of determining the rotation of arms 8 and 9, can be independent one from the other, therefore they can be controlled by independent commands, or they can be activated simultaneously by the same command.

The hinges 6 and 7 can be supplied with adjustable stops by means of which one can vary the totally opened position of arms 8 and 9 on which the ray rake groups 4 are applied.

Cross bar 3 is supported and adjusted in its height from the ground through the supporting and regulating means 5.

In the embodiment exemplified in the drawings, said means 5 are constituted by a frame structure, connected at the back to the hubs 20 of the wheels 21, connected at the front, in a rotating way, with cross bar 3, through the beam 16 and the rotating couplings 18.

Said means 5, for the support and adjustment of the distance of the cross bar 3 from the ground, can perform ample rotations on the rotating couplings 18.

Normally said rotation starts from a position in which the frame structure 5 is nearly parallel to the level of the plane defined by draw bar 1 and cross bar 3 till it reaches a position in which said frame is on a plane that is perpendicular to the said first one (a plane defined by cross bar 3 and draw bar 1) and normally perpendicular to the ground, allowing in this way an ample variation with respect to the ground of the level of the said cross bar 3, therefore of the level of the ray rake groups 4 supported by said bar.

On said frame structure 5, to which are applied wheels 21, the normally jutting wing shaped coupling means 22 are anchored, while other corresponding coupling means 23, also normally protruding wing shaped, are placed on cross bar 3. A jack 24 is connected to said coupling means 22 and 23 in such a way as to make its activation determine the rotation of frame 5 and, consequently, the raising and lowering with respect to the ground of the said cross bar 3.

The said machine therefore allows the operator to adjust the height of cross bar 3 from the ground and therefore of ray rake groups 4, through steering of jack 24. It allows the adjustment of the position of the teeth of the ray rake wheels from the ground, so as to avoid cutting into it in case it is sandy and to skim it in the event of compact terrain as is the case with clay.

It furthermore allows the raising of the ray rake groups by about 50 cm. and more to make the machine capable of moving in the fields from one place of work to an other, non adjacent one, without activating jacks 12.

The activation of jack 24 only, allows therefore the transfer of the machine on roads that are slightly lower than the level of the fields, without the necessity of rotating ray rake groups 4 upwards and towards the median axis of the same machine.

Jacks 12 allow instead the rotation of the ray rake groups 4 to position them above cross bar 3, as is required in the case of transfer on public roads, so as to occupy a minimum width of the roadbed, without hindering the movement of the other vehicles. Jacks 12 can be used also for obtaining limited rotations and, if independent one from the other, the rotation of a single arm 8 or 9 as is needed if the machine should operate on only one side of the tractor which tows it.

In production the single construction details can be modified, without modifying the logical functions of the machine as defined by the following claims.

What is claimed is:

1. A towed ray rake with independent adjustments comprising:

a draw bar (1) connected at the back with a cross bar (3) for carrying a support for ray rake groups (4) that rotate on a plane that is nearly perpendicular to the axis of said draw bar (1);

supporting and regulating means (5) for raising the cross bar (3) from the ground;

two actuators that operate independently from each other, one of said actuators rotating the ray rake groups on the plane that is nearly perpendicular to the axis of the draw bar and another of said actuators raising the cross bar (3) from the ground.

2. The towed ray rake as claimed in claim 1, wherein the cross bar (3) ends with two hinges (6) and (7) that each have a rotation axis that is nearly parallel to the axis of the draw bar (1), said hinges supporting arms (8) and (9) on which ray rake groups (4) are fixed.

3. The towed ray rake as claimed in claim 2, wherein said one of said actuators comprises a pair of jacks that each have one end fixed to said cross bar adjacent to said draw bar and another end fixed to a respective one said supporting arms.

4. The towed ray rake as claimed in claim 3, wherein the jacks (12) are independent from each other in their activation.

5. The towed ray rake as claimed in claim 3, wherein the jacks (12) are activated simultaneously by a single command.

6. The towed ray rake as claimed in claim 1, wherein the supporting and regulating means (5) comprises a frame structure connected at the back to hubs (20) of wheels (21) and connected at the front in a rotating way with the cross bar (3).

7. The towed ray rake as claimed in claim 6, wherein said frame structure is rotatingly connected to the cross bar (3) to be rotatable at least from a position in which said frame structure is nearly parallel to the plane defined by the draw bar (1) and the cross bar (3) to a plane that is nearly perpendicular to it.

8. The towed ray rake as claimed in claim 7, wherein said frame structure comprises a first hinge connected to an end of said another one of said actuators, and wherein another end of said another one of said actuators is hingedly attached to a second coupling on the cross bar (3).

9. A towed ray rake comprising:

a draw bar attached to a cross bar, said cross bar having hinged ends for carrying ray rake groups;

a rotatable frame carrying wheels for the towed ray rake at a rear end of said frame, said frame being hingedly connected to said cross bar at a front end of said frame;

a first actuator connecting said rear end of said frame to said cross bar for rotating said cross bar about said rear end of said frame; and a pair of second actuators that each are connected at one end to said cross bar adjacent to said draw bar and at another end to a respective one of said hinged ends for rotating said hinged ends, said first actuator being independent from said pair of second actuators so that said hinged ends rotate independently of rotation of said cross bar.

* * * * *